(12) United States Patent
Gianchandani et al.

(10) Patent No.: US 7,789,371 B2
(45) Date of Patent: Sep. 7, 2010

(54) LOW-POWER PIEZOELECTRIC MICRO-MACHINED VALVE

(76) Inventors: Yogesh B. Gianchandani, 2658 White Oak Dr., Ann Arbor, MI (US) 48103; Gregory Francis Nellis, 1426 Starr Grass Dr., Madison, WI (US) 53719; Sanford A. Klein, 5205 Whitcomb Dr., Madison, WI (US) 53711; John Moon Park, 1029 Barton Dr., #205, Ann Arbor, MI (US) 48105; Allan Thomas Evans, 330 E. Kingsley, Ann Arbor, MI (US) 48104; Ryan Taylor, 2801 Monroe St., Apt. 1W, Madison, WI (US) 53711; Tyler R. Brosten, 3100 Wagonwheel Dr., Apt. 4, Bozeman, MT (US) 59715

( * ) Notice: Subject to any disclaimer, the term of this patent is extended or adjusted under 35 U.S.C. 154(b) by 610 days.

(21) Appl. No.: 11/756,342

(22) Filed: May 31, 2007

(65) Prior Publication Data
US 2008/0296523 A1 Dec. 4, 2008

(51) Int. Cl.
*F16K 31/02* (2006.01)
(52) U.S. Cl. ............................. 251/129.06; 251/129.01; 251/333
(58) Field of Classification Search ............ 251/129.01, 251/129.06, 331, 333
See application file for complete search history.

(56) References Cited

U.S. PATENT DOCUMENTS

| | | | | |
|---|---|---|---|---|
| 5,029,805 A * | 7/1991 | Albarda et al. | ................. | 251/11 |
| 5,161,774 A * | 11/1992 | Engelsdorf et al. | ............ | 251/11 |
| 5,238,223 A * | 8/1993 | Mettner et al. | .............. | 251/368 |
| 5,647,574 A * | 7/1997 | Mettner et al. | ......... | 251/129.06 |
| 5,970,998 A * | 10/1999 | Talbot et al. | ................... | 137/1 |

OTHER PUBLICATIONS

Enabling Technologies (Chapter), Service: Lab-On-A-Chip: The Revolution in Portable Instrumentation—4th edition, Jan. 11, 2002, Frost & Sullivan.
A Piezoelectric Microvalve for Micropropulsion, Proceedings of AAIA Conference on Nanotech, Sep. 9-12, 2002, Houston, Texas.
A High-Flow Termopheumatic Microvalve with Improved Efficiency and Integrated State Sensing, Journal of Microelectromechanical Systems, vol. 12, No. 2, Apr. 2003, IEEE,Washington, DC.
Frabrication, Characterization and Computational Modeling of a Piezoelectrically Actuated Microvalve for Liquid Flow Control, Journal of Microelectromechanical Systems, vol. 15, No. 3, Jun. 2006, IEEE,Washington, DC.

* cited by examiner

*Primary Examiner*—John K Fristoe, Jr.
(74) *Attorney, Agent, or Firm*—Boyle Fredrickson, S.C.

(57) ABSTRACT

A piezoelectric microvalve employs a valve element formed of hermetically sealed and opposed plates flexed together by a cross axis piezoelectric element. Large flow modulation with small piezoelectric actuator displacement is obtained by perimeter augmentation of the valve seat which dramatically increases the change in valve flow area for small deflections.

17 Claims, 3 Drawing Sheets

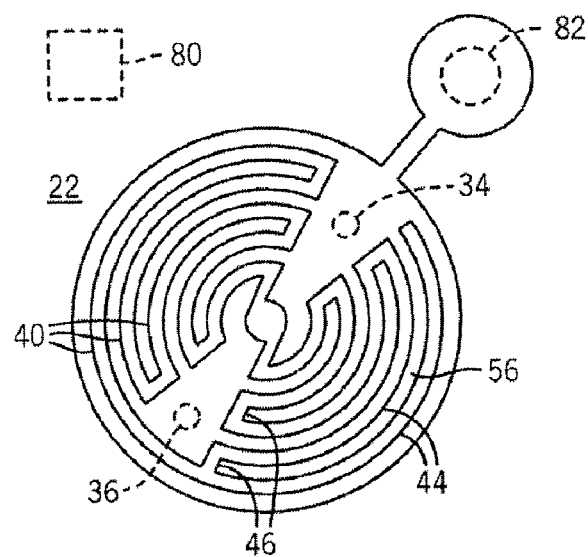
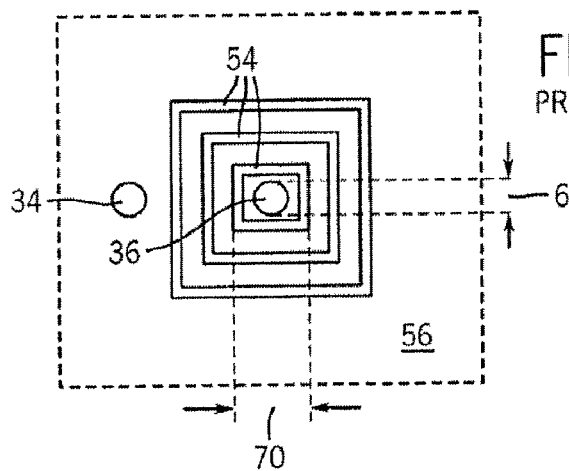
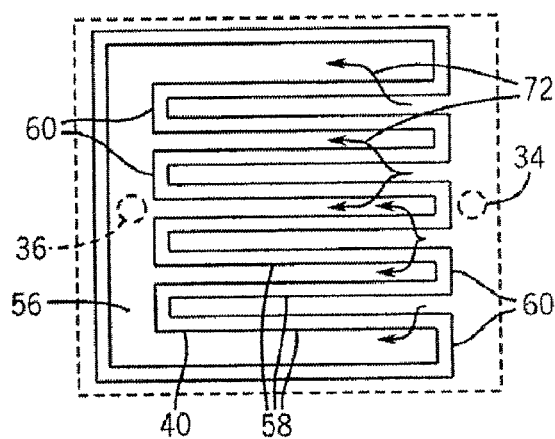

LOW-POWER PIEZOELECTRIC MICRO-MACHINED VALVE

STATEMENT REGARDING FEDERALLY SPONSORED RESEARCH OR DEVELOPMENT

This invention was made with United States government support awarded by the following agencies: NASA NNA05CP82G and NNA05CP85G. The United States government has certain rights in this invention.

CROSS-REFERENCE TO RELATED APPLICATIONS

Background of the Invention

Compact, electrically actuated valves may be used in a variety of applications for example ranging from drug delivery to metering cryogenic gases in cooling systems for future space missions. Such valves may need to be highly reliable, resistant to extremes in temperatures, resistant to contamination from the environment, and energy efficient.

One promising approach for the production of such valves constructs the valve body from micro-machined silicon using integrated circuit techniques. These micro-machined valve elements may be actuated by a piezoelectric actuator having very low power consumption and yet able to apply a very high force to the valve elements, necessary for high-pressure control in some applications.

One challenge to the use of piezoelectric actuators is the relatively small displacement that they produce resulting in comparably low flow modulation in the valve, flow modulation being the difference in flow between when the valve is opened and closed. This problem of small displacement provided by piezoelectric actuators can be aggravated when valves are used at cryogenic temperatures which reduce the displacement produced by the piezoelectric element.

BRIEF SUMMARY OF THE INVENTION

The present invention provides an electrically actuated microvalve having a cross-plane piezoelectric actuator working to compress a pair of planar, micro-machined valve elements. The small displacement of the piezoelectric actuator is offset by perimeter augmentation of a valve seat between the valve elements. The result is a valve that can accommodate high actuation pressures and provide large flow modulation. A protective housing may be used to support the piezoelectric actuator and may be matched to the actuator with respect to thermal expansion to preserve actuator operating range over a wide range of temperatures. One movable valve element may be a monolithic silicon wafer providing a continuous membrane preventing contamination between the environment and the fluid controlled by the valve, and allowing the incorporation of electrical sensor elements as integrated circuit components directly in the valve element.

Specifically, the present invention provides a high flow range microvalve having an opposed first and second plate spaced to provide therebetween a flow channel between an inlet and outlet. A piezoelectric actuator is positioned to press on the first plate to flex the first plate toward the second plate to constrict the flow channel over an actuation area and an augmented length valve seat is positioned between the first and second plate in the actuation area separating the inlet and outlet when the flow channel is constricted. The augmented length valve seat may have a contiguous length greater than four to ten times a square root of the actuation area when the actuation area is an area bounded by contact through the valve seat ridge between the first and second plates. Alternatively the augmented length valve seat may have a contiguous length greater than eight to fifty times a square root of the minimum cross-sectional area of the inlet or outlet.

Thus it is one feature of at least one embodiment of the invention to provide significantly increased flow modulation range for a micro-machined valve using a piezoelectric actuator.

It is another feature of at least one embodiment of the invention to provide for greater flow modulation in a valve that may be hermetically sealed by the bonding of two wafers and actuated by a low displacement flexing of one wafer.

The first plate may be a silicon wafer and the second plate may be glass.

It is another feature of at least one embodiment of the invention to provide a low cost valve incorporating a glass substrate that may match the coefficient of thermal expansion of a silicon wafer, the latter better suited for micromachining, so that the plates may remain bonded without undue stress over a wide range of temperatures.

The augmented length valve seat may be a serpentine wall separating the inlet and outlet.

Thus it is a feature of at least one embodiment of the invention to provide a valve seat topology that may be flexibly tailored to a particular valve configuration and requirement.

The serpentine walls may be comprised of parallel interconnected line segments or alternatively the serpentine walls may be comprised of concentric interconnected arc segments.

It is thus a feature of at least one embodiment of the invention to provide for patterns of generating augmented valve seat perimeters that provide for high density and simple construction.

The valve may include a housing supporting at least one of the first and second plates and containing the piezoelectric actuator to position a first end of the piezoelectric actuator to press on the first plate and restrain a second end of the piezoelectric actuator with respect to the first plate so that dimensional changes of the piezoelectric actuator flexes the first plate.

It is thus a feature of at least one embodiment of the invention to provide for a sealed microvalve where the housing may also support the actuator.

The housing may have a coefficient of thermal expansion matched to the piezoelectric actuator, for example, by constructing the housing from a ceramic material.

It is thus another feature of at least one embodiment of the invention to provide housing material that offsets dimensional changes in the actuator with temperature to preserve the small operating range of the actuator.

The opposed first and second plate may provide between them a sealed flow channel between the inlet and outlet and the first plate may be a monolithic silicon substrate.

Thus it is a feature of at least one embodiment of the invention to provide an extremely simple fabrication technique employing as few as two wafers that shield the fluid stream controlled by the valve from contamination and that reduces dead volumes in the valve.

The silicon substrate may support one or more electronic devices fabricated on the silicon and selected from the group consisting of a temperature sensing element and a strain sensing element.

It is thus a feature of at least one embodiment of the invention to allow electronic sensing elements to be incorporated directly in one of the valve plates.

These particular features and advantages may apply to only some embodiments falling within the claims and thus do not define the scope of the invention.

BRIEF DESCRIPTION OF THE DRAWINGS

FIG. 4 is a bottom plan view of the first plate showing an arcuate serpentine valve seat;

FIG. 5 is a figure similar to that of FIG. 4 showing a prior art valve seat and comparing the valve seat perimeter to actuation and inlet and outlet areas;

FIG. 6 is a figure similar to that of FIGS. 4 and 5 showing a rectilinear serpentine valve seat and comparing the valve seat perimeter to actuation and orifice areas.

DETAILED DESCRIPTION OF THE INVENTION

Figure 1:
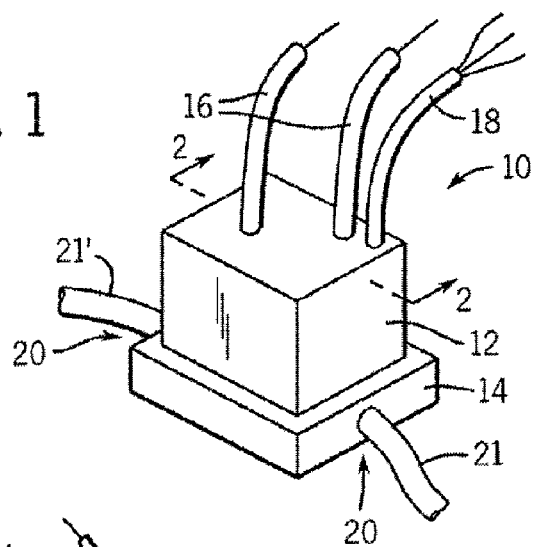
FIG. 1 is a perspective view of the microvalve of the present invention mounted on a header for attachment to standard tubing.

Referring now to FIG. 1, a microvalve 10 of the present invention may provide for a block-shaped housing 12, for example, defining a 1 cm cube. The microvalve 10 may fit against the upper surface of adapter plate 14, the latter providing connection points 20 to a standard-sized inlet tube 21 and outlet tube 21' through which a fluid controlled by the valve can pass.

Figure 2:
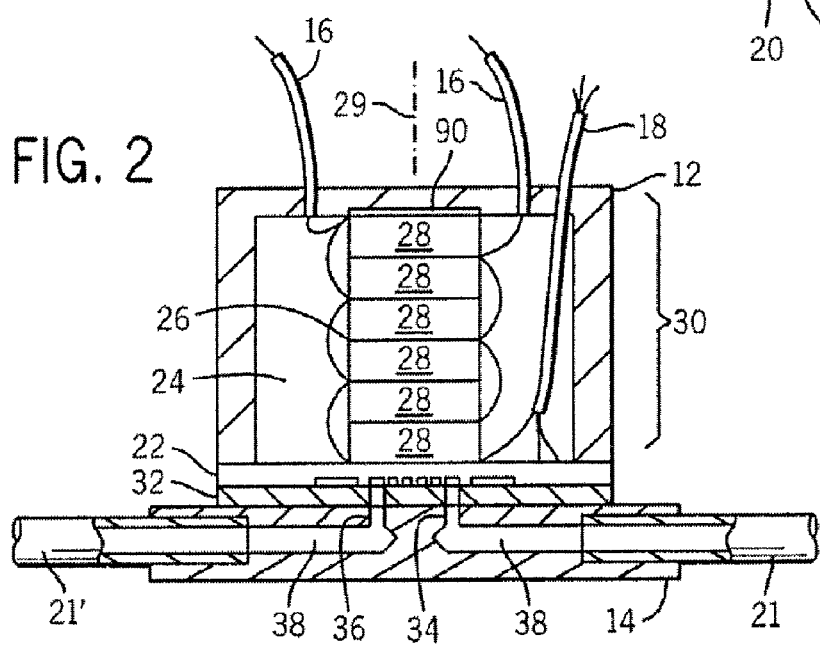
FIG. 2 is a cross-sectional view along line 2-2 of FIG. 1 showing a piezoelectric stack held by the housing of the microvalve against a first plate which may flex against a second plate to control fluid flow between an inlet and outlet valve communicating with the header.

Referring also to FIG. 2, a lower, open face of the housing 12 may be bonded to the periphery of a continuous upper valve plate 22 thereby hermetically enclosing an actuator volume 24 within the housing 12. The housing 12 may be bonded to the upper valve plate 22 using a high temperature epoxy such as Stycast 2850FT epoxy.

Positioned within the actuator volume 24 is a piezoelectric stack 26 comprised of a set of piezoelectric elements 28 assembled together along a vertical axis 29 generally perpendicular to the upper surface of the upper valve plate 22. The piezoelectric stack 26 stretches from the upper surface of the upper valve plate 22 to a lower inner surface of the upper face of the housing 12. A set of electrical power leads 16 may pass through an upper face of the housing 12 to connect to electrodes sandwiching each piezoelectric element 28 to cause the expansion of the stack 26 along a vertical axis 29.

As positioned, the piezoelectric stack 26 will increase in height along axis 29 under the application of electrical power through leads 16, pushing down on the upper valve plate 22 to compress and thus deform an actuation area of the upper valve plate 22, to in turn press against an upper surface of a lower valve plate 32 parallel to and bonded to the underside of the upper valve plate 22.

The housing 12 may be constructed of a ceramic material, for example, Macor machinable ceramic commercially available from The Morgan Crucible Company plc of Berkshire, United Kingdom. The coefficient of expansion of the material of the housing 12 is selected to have a coefficient of thermal expansion approximately equal to that of the piezoelectric stack 26 so that thermal expansion or contraction of the height of the stack 26 along axis 29 is offset by a corresponding expansion or contraction in the height 30 of the side walls of the housing 12. In this way, temperature extremes do not adversely affect the operating range of the piezoelectric stack 26 or actuate or deactuate the microvalve 10.

Figure 3:
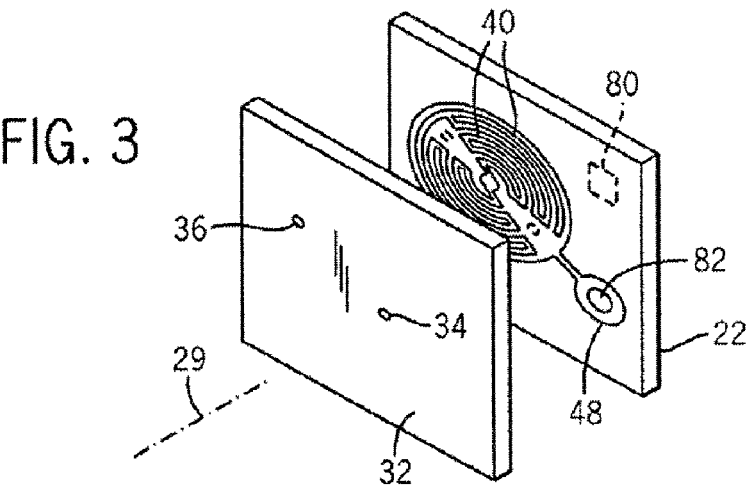
FIG. 3 is an exploded perspective view of the first and second plate of FIG. 1 showing a serpentine valve seat and a pressure sensor chamber formed in the underside of the first plate.

Referring now also to FIGS. 2 and 3, the lower valve plate 32 provides for an inlet 34 and an outlet 36 passing vertically through the lower valve plate 32 and into the adapter plate 14. Within the adapter plate 14, the inlet 34 and outlet 36 are received by adapter channels 38 that are sized to accept inlet tube 21 and outlet tube 21'.

Referring now to FIGS. 2, 3, and 4, the lower surface of the upper valve plate 22 includes a serpentine valve seat 40 providing a set of ridges extending toward the upper surface of the lower valve plate 32 and aligned with inlet 34 and outlet 36 (shown superimposed on the view of the upper valve plate 22 in FIG. 4). The serpentine valve seat 40 fully surrounds the inlet 34 to separate the inlet 34 from the outlet 36 when the upper valve plate 22 is compressed against the lower valve plate 32 so that the serpentine valve seat 40 seals against the lower valve plate 32.

The serpentine valve seat 40, in a first embodiment, consists of a set of concentric arcuate elements 44 joined by short radial elements 46 to provide a contiguous path around outlet 36 having an extended length far in excess of that needed to enclose the outlet 36. This extended perimeter provided by the serpentine valve seat 40 greatly increases the flow area of the microvalve 10 when the microvalve 10 is open, for small displacements of the upper valve plate 22.

Referring now to FIG. 5, in a conventional microvalve 10, inlet 34 may be separated from an outlet 36 by one or more discontinuous valve seat ridges 54 that provide multiple barriers between the inlet 34 and outlet 36 to reduce leakage. An activation area 56 may be defined as an operably movable portion of the upper valve plate 22 supporting the valve seat ridges 54, or preferably the smallest continuous area bounded by contact between the first and second plates through the valve seat ridges 54. The perimeter length of the valve seat ridge 54 corresponding to this activation area will generally be less than or equal to four times the square root of the activation area 56 corresponding to a circular or square valve seat ridge.

In contrast, as seen in FIG. 6, a serpentine valve seat 40 may bound a relatively smaller activation area 56 when compared to its perimeter length as a result of its convoluted route. In this case the serpentine valve seat 40 is composed of a set of parallel rectilinear elements 58 joined by short perpendicular segments 60. In the present invention the length of the serpentine valve seat 40 will be greater than four times a square root of the activation area 56 and typically more than ten times the square root of this activation area. The depictions of the serpentine valve seat 40 in FIGS. 4 and 6 are simplified and will typically provide more than eighty rectilinear segments 58 or arcuate elements 44.

Referring to FIG. 5, this amount of this perimeter augmentation may also be defined with respect to effective area of the outlet 36 and comparing the perimeter length to this effective area. As shown in FIG. 5, the cross-sectional area of outlet 36 may be approximately diameter 61 squared. In the prior art, the closest valve seat ridge 54 will have a perimeter length of approximately four times side dimension 70 which may be placed closely around outlet 36, for example, separated by no more than half the diameter 61 on all sides. In this case, the perimeter length of the closest valve seat ridge 54 will be about eight times the diameter 61 or less than eight times the square root of the area of the outlet 36.

Referring to FIG. 6, the serpentine valve seat 40 will have a perimeter length that is more then ten to fifty times the square root of the area of outlet 36.

This augmented perimeter length provides a large area through which fluid 72 may flow between inlet 34 and outlet 36 so that minor amounts of displacement between the upper valve plate 22 and lower valve plate 32 provide a multiplicatively greater flow modulation.

Figure 7:
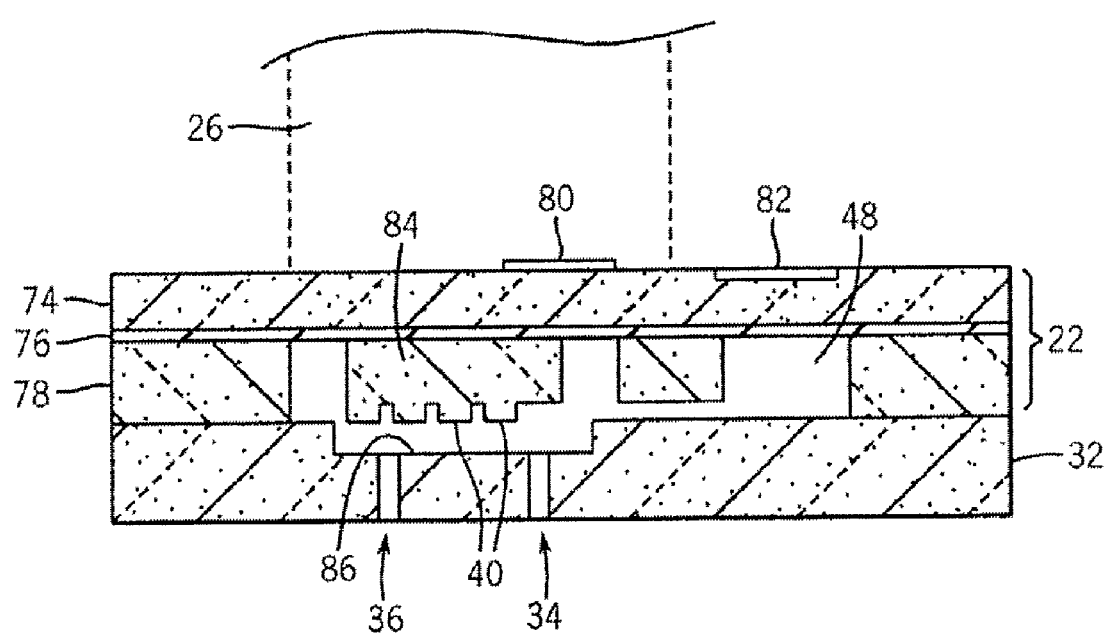
FIG. 7 is a fragmentary cross-section similar to that of FIG. 2 showing detailed construction of the first and second plates.

Referring now to FIGS. 2, 4, and 7, the upper valve plate 22 may be a conventional SOI silicon wafer having an integrated circuit quality top silicon layer 74 on top of an oxide layer 76. The oxide layer 76 may in turn be on top of a bottom substrate layer 78 (typically also silicon). The top silicon layer 74 may be etched or ground to an arbitrary thickness suitable to provide the desired strength and flexibility for flexing. The top silicon layer 74 may then treated using conventional integrated circuit techniques to add a temperature sensor 80, for example a patterned platinum metallization providing a resistive temperature detector (RTD) measuring the temperature of the upper valve plate 22 (and hence the temperature of the fluid controlled by the microvalve 10, for example). The top silicon layer 74 may also be treated to create a piezoelectric resistor based pressure sensor 82 formed to sense strain and positioned over a pressure sensor chamber 48 as will be described below, sensing pressure of the fluid controlled by the microvalve 10.

After the formation of the temperature sensor 80 and pressure sensor 82, the bottom substrate layer 78 which will provide the lower surface of the upper valve plate 22, may be deep-etched to define a valve boss 84 extending downward toward the lower valve plate 32. The valve boss so etched, is joined to the remaining portion of the first valve plate 22 only by the oxide layer 76 and the top silicon layer 74. The oxide layer 76 may form a stop for the deep etching of the bottom substrate layer 78 avoiding risk of etching of the top silicon layer 74 or the need for precise process control.

The lower surface of the valve boss 84 may provide the etched pattern of the serpentine valve seat 40 as a set of downwardly extending ridges. For example, each ridge may be approximately 50 μm wide and 120 μm deep. In turn, the upper surface of the lower valve plate 32 beneath the valve boss 84 may have an etched recess 86 holding the inlet 34 and outlet 36 beneath the valve boss 84 so the downward flexure of the upper valve plate 22 by the piezoelectric stack 26 causes the serpentine valve seat 40 to contact the upper surface of the etched recess 86 and block passage of fluid between inlet 34 and outlet 36. The range of travel of the valve boss 84, for example, may be on the order of 2 μm.

The upper surface of the lower valve plate 32 is bonded at its periphery to the periphery of the lower surface of upper valve plate 22. Similar thermal expansion characteristics of silicon and glass materials of the upper valve plate 22 and lower valve plate 32, respectively, prevent delamination or undue stress over a wide range of temperatures.

Referring to FIGS. 2 and 4, the inlet 34 may communicate through a short path to the pressure sensor chamber 48 also formed by deep etching or similar techniques and providing a thin upper membrane formed of the oxide layer 76 and thin top silicon layer 74 flexing under pressure as sensed by the piezoresistors or conventional resistive devices for example formed as strain gauges in a Wheatstone bridge or the like. As shown in FIG. 1, signal leads 18 may pass through the upper face of the housing 12 to communicate with temperature sensor 80 and pressure sensor 82.

During the bonding of the upper valve plate 22 and lower valve plate 32, the upper face of the etched recess 86 facing the boss 84 may be coated with aluminum to prevent unintentional bonding of the boss 84 to the lower valve plate 32. This aluminum may then be etched or dissolve away.

Referring to FIG. 2, the piezoelectric stack 26 may be attached to the lower face of the upper face of the housing 12 by epoxy placed to bridge a narrow gap 90 between the upper face of the housing 12 and the upper surface of the piezoelectric stack 26. During a curing of the epoxy, the piezoelectric stack 26 is energized at a maximum voltage to expand the piezoelectric stack 26 along axis 29 thereby closing the microvalve 10. This activation of the stack 26 removes the effects of tolerance differences in dimensions between the piezoelectric stack 26 and the housing 12 allowing the assembly of these different elements while preserving precise positioning of the piezoelectric stack 26 necessary to ensure closure of the microvalve 10.

The piezoelectric stack 26 does not need to be affixed to the upper surface of upper valve plate 22 and thus there is no danger of stresses being generated between these elements caused by differences in thermal expansion rates.

While the above description has been with respect to a normally-open valve, it will be understood that normally-closed valves or valves that are partially open (exploiting both positive and negative piezoelectric actuation voltages) may be created by simple adjustments in the geometry and/or actuation voltages. The perimeter augmentation of the present invention is applicable to these embodiments as well. Further, while a continuous upper valve plate 22 has been described which substantially reduces valve "dead-volume", in an alternative embodiment, the upper valve plate 22 can be fabricated to be separate from the remainder of the silicon wafer suspended by means of cantilevered arms etched free from the wafer to reduce the necessary actuation pressure and/or distortion of the valve seat.

The present invention has been described in terms of the preferred embodiment, and it is recognized that equivalents, alternatives, and modifications, aside from those expressly stated, are possible and within the scope of the appending claims.

We claim:

1. A high flow range microvalve comprising:
    an opposed first and second plate spaced to provide therebetween a flow channel between an inlet and outlet;
    a piezoelectric actuator communicating with the first plate to move the first plate toward or away from the second plate to control a constriction of the flow channel over an actuation area; and
    an augmented length valve seat positioned between the first and second plate in the actuation area and separating the inlet and outlet, the augmented length valve seat having a contiguous length greater than four times a square root of the actuation area;
    wherein the actuation area is an area bounded by contact between the first and second plates through the valve seat; and
    wherein the augmented length valve seat is a serpentine wall separating the inlet and outlet.

2. The high flow range microvalve of claim 1 wherein the augmented length valve seat has a contiguous length greater than ten times the square root of the actuation area.

3. The high flow range microvalve of claim 1 wherein the first plate is a silicon-on-insulator substrate.

4. The high flow range microvalve of claim 1 wherein the first plate is a silicon wafer and the second plate is a glass expansion matched to the silicon wafer.

5. The high flow range microvalve of claim 1 where in the serpentine walls are comprised of parallel interconnected line segments.

6. The high flow range microvalve of claim 1 where in the serpentine walls are comprised of concentric interconnected arc segments.

7. A high flow range microvalve comprising:
- an opposed first and second plate spaced to provide therebetween a flow channel between an inlet and outlet;
- a piezoelectric actuator communicating with the first plate to move the first plate toward or away from the second plate to control a constriction of the flow channel over an actuation area; and
- an augmented length valve seat positioned between the first and second plate in the actuation area and separating the inlet and outlet, the augmented length valve seat having a contiguous length greater than four times a square root of the actuation area;
- wherein the actuation area is an area bounded by contact between the first and second plates through the valve seat;
- further including a housing supporting at least one of the first and second plates and containing the piezoelectric actuator to position a first end of the piezoelectric actuator to press on the first plate and restrain a second end of the piezoelectric actuator so that dimensional change of the piezoelectric actuator flexes the first plate;
- wherein the housing has a coefficient of thermal expansion matched to the piezoelectric actuator.

8. The high flow range microvalve of claim 7 wherein the housing has a coefficient of thermal expansion matched to a one of the first and second plates attached to the housing.

9. The high flow range microvalve of claim 7 wherein the housing is a ceramic material.

10. A high flow range microvalve comprising:
- an opposed first and second plate spaced to provide therebetween a flow channel between an inlet and outlet providing a cross-sectional area;
- a piezoelectric actuator communicating with the first plate to move the first plate toward and away from the second plate to control a constriction of the flow channel over an actuation area; and
- an augmented length valve seat positioned between the first and second plate adjacent to and around the outlet to block flow into the outlet when the flow channel is constricted, the augmented length valve seat having a contiguous length greater than ten times a square root of the effective cross-sectional area of the outlet;
- wherein the augmented length valve seat is a serpentine wall separating the inlet and outlet.

11. The high flow range microvalve of claim 10 wherein the augmented length valve seat has a contiguous length greater than fifty times the square root of the effective cross-sectional area.

12. The high flow range microvalve of claim 10 wherein the serpentine walls are comprised of parallel interconnected line segments.

13. The high flow range microvalve of claim 10 where in the serpentine walls are comprised of concentric interconnected arc segments.

14. The high flow range microvalve of claim 10 wherein the first plate is a silicon wafer and the second plate is a glass expansion matched to the silicon wafer.

15. A high flow range microvalve comprising:
- an opposed first and second plate spaced to provide therebetween a flow channel between an inlet and outlet providing a cross-sectional area;
- a piezoelectric actuator communicating with the first plate to move the first plate toward and away from the second plate to control a constriction of the flow channel over an actuation area; and
- an augmented length valve seat positioned between the first and second plate adjacent to and around the outlet to block flow into the outlet when the flow channel is constricted, the augmented length valve seat having a contiguous length greater than ten times a square root of the effective cross-sectional area of the outlet;
- further including a housing supporting at least one of the first and second plates and containing the piezoelectric actuator to position a first end of the piezoelectric actuator to press on the first plate and restrain a second end of the piezoelectric actuator so that dimensional changes of the piezoelectric actuator flexes the first plate.
- wherein the housing has a temperature coefficient of expansion matched to the piezoelectric actuator.

16. The high flow range microvalve of claim 15 wherein the housing has a coefficient of thermal expansion matched to a one of the first and second plates attached to the housing.

17. The high flow range microvalve of claim 15 wherein the housing is a ceramic material.

* * * * *